(12) United States Patent
Chien (10) Patent No.: US 10,196,498 B2
(45) Date of Patent: Feb. 5, 2019

(54) METHOD FOR MAKING COLORED FILM, COLORED FILM, COLORED MATERIAL, AND OPHTHALMIC LENS

(71) Applicant: ScienBiziP Consulting (Shenzhen) Co., Ltd., Shenzhen (CN)

(72) Inventor: Hsiu-Wen Chien, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 144 days.

(21) Appl. No.: 15/286,573

(22) Filed: Oct. 6, 2016

(65) Prior Publication Data

US 2018/0044501 A1 Feb. 15, 2018

(30) Foreign Application Priority Data

Aug. 11, 2016 (TW) .................................. 105125639

(51) Int. Cl.
| | |
|---|---|
| *C08K 3/34* | (2006.01) |
| *C08J 5/18* | (2006.01) |
| *C08K 5/42* | (2006.01) |
| *G02C 7/04* | (2006.01) |
| *G02C 7/10* | (2006.01) |
| *B29D 11/00* | (2006.01) |

(52) U.S. Cl.
CPC ........ *C08K 3/346* (2013.01); *B29D 11/00038* (2013.01); *B29D 11/0048* (2013.01); *C08J 5/18* (2013.01); *C08K 5/42* (2013.01); *G02C 7/046* (2013.01); *G02C 7/108* (2013.01); *B29D 11/00317* (2013.01); *C08J 2335/02* (2013.01); *C08K 2201/014* (2013.01)

(58) Field of Classification Search
CPC ...................................................... C08K 3/346
See application file for complete search history.

(56) References Cited

U.S. PATENT DOCUMENTS

| | | | | |
|---|---|---|---|---|
| 7,666,461 B2* | 2/2010 | Qiu | ...................... | A61L 27/306 351/159.73 |
| 2014/0268028 A1* | 9/2014 | Vanderlaan | ............ | G02B 1/043 351/159.33 |
| 2014/0369944 A1* | 12/2014 | Kozacheck | .............. | A61K 8/25 424/61 |

* cited by examiner

*Primary Examiner* — Michael F Pepitone
(74) *Attorney, Agent, or Firm* — ScienBiziP, P.C.

(57) ABSTRACT

A method for making a colored film includes following steps of providing a mixture comprising a hydrophilic monomer, a functionalized vinylic monomer, a clay, a cross-linking agent, and an initiator; mixing a pigment and a solvent with the mixture to form a colored material; and placing the colored material into a mold, and exposing the colored material to ultraviolet radiation or heating the colored material, to cause the hydrophilic monomer, the functionalized vinylic monomer, the cross-linking agent, and the initiator in the colored material to undergo a polymerization reaction to form a cross-linking network, and the clay in the colored material to be dispersed in the cross-linking network, thereby forming the colored film. The disclosure also provides a colored film made by above method, a colored material making for the colored film, and an ophthalmic lens.

16 Claims, 5 Drawing Sheets

METHOD FOR MAKING COLORED FILM, COLORED FILM, COLORED MATERIAL, AND OPHTHALMIC LENS

FIELD

The subject matter herein generally relates to a colored film, a colored material, an ophthalmic lens, and a method for making the colored film.

BACKGROUND

Contact lenses are commonly worn by users to correct vision, or for cosmetic or therapeutic reasons. The contact lens may comprise a gel substrate and a colored film connected to the gel substrate. A connecting force between the gel substrate and the colored film needs to increase to improve a service life of the contact lens.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
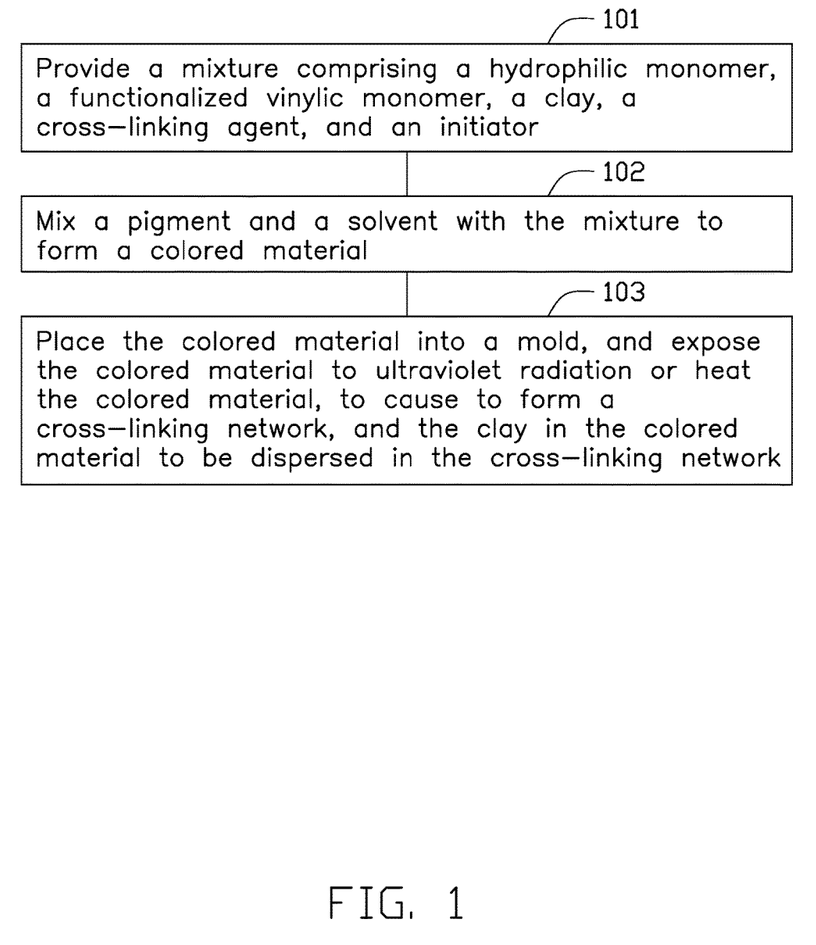
FIG. 1 is a flowchart of an exemplary embodiment of a method for making a colored film.

FIG. 1 illustrates a flowchart of a method for making a colored film in accordance with an exemplary embodiment.

The exemplary method is provided by way of example, as there are a variety of ways to carry out the method. Each block shown in FIG. 1 represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 101.

At block 101, a mixture comprising a hydrophilic monomer, a functionalized vinylic monomer, a clay, a cross-linking agent, and an initiator is provided. The hydrophilic monomer has a mass percentage of about 20% to about 50% of a total mass of the mixture. The functionalized vinylic monomer has a mass percentage of about 25% to about 60% of the total mass of the mixture. The clay has a mass percentage of about 0.5% to about 42% of the total mass of the mixture. The cross-linking agent has a mass percentage of about 1% to about 25% of the total mass of the mixture. The initiator has a mass percentage of about 0.5% to about 20% of the total mass of the mixture.

The hydrophilic monomer may be selected from a group consisting of methacryloxyalkyl siloxanes, 3-methacryloxypropylpentamethyldisiloxane, bis(methacryloxypropyl)tetramethyl-disiloxane, monomethacrylatedpolydimethyl siloxane, mercapto-terminatedpolydimethyl siloxane, N-[tris(trimethylsiloxy)silylpropyl]acrylamide, N-[tris(trimethylsiloxy)silylpropyl]methacrylamide, tris(pentamethyldisiloxanyl)-3-methacrylatopropylsilane (T2), 3-methacryloxypropyletris(trimethylsiloxy)silane, 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dim ethylaminoethylmethacrylamide, acrylamide, methacrylamide, ally alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

The functionalized vinylic monomer comprises at least one functional group selected from a group consisting of hydroxyl group, amino group, imino group, carboxyl group, epoxy group, amide group, acyl halogeno group, isothiocyanate group, isocyanate group, halogeno group, and acid anhydride. In at least one exemplary embodiment, the functionalized vinylic monomer has a chemical structural formula of which comprises carboxyl groups and imino groups.

In at least one exemplary embodiment, the clay comprises aluminium silicate as a main composition. The clay may be selected from a group consisting of kaolinite, dickite, halloysite, nacrite, montmorillonite, pyrophyillite, talc, vermiculite, nontronite, and saponite, illite, chlorite, sepiolite, zeolite, attapulgite, and synthetic clay (such as laponite). The clay is lamellar. The clay has a length of about 1 nm to about 1000 nm, and has a thickness of about 0.1 nm to about 100 nm. In at least one exemplary embodiment, the clay is a lamellar montmorillonite. The lamellar montmorillonite has length of about 23 nm to about 27 nm, and has a thickness of about 1 nm.

The cross-linking agent may be selected from a group consisting of ethylene glycol dimethacrylate (EGDMA), trimethylolpropane trimethacrylate (TMPTMA), tri(ethylene glycol) dimethacrylate (TEGDMA), tri(ethylene glycol) divinyl ether (TEGDVE), and trimethylene glycol dimethacrylate.

The initiator may be a photoinitiator or a thermal initiator. The photoinitiator may be selected from a group consisting of benzoin methyl ether, diethoxyacetophenone, a benzoylphosphine oxide initiator, ethyl 2-dimethylaminobenzoate, 2-isopropylthioxanthone, 1-hydroxycyclohexyl phenyl ketone, Darocur type initiator and Irgacur type initiator. In at least one exemplary embodiment, the photoinitiator is selected from Darocur-1173, Darocur-2959, and Irgacure-1173. The benzoylphosphine oxide initiator may be selected from a group consisting of 2,4,6-trimethylbenzoyldiphenylophosphine oxide, bis-(2,6-dichlorobenzoyl)-4-N-propyl-phenylphosphine oxide, and bis-(2,6-dichlorobenzoyl)-4-N-butylphenylphosphine oxide. The thermal initiator may be selected from a group consisting of 2,2'-azobis (2,4-dimethylpentanenitrile), 2,2' -azobi s (2-methylpropanenitrile), 2,2' -azobi s (2-methylbutanenitrile), azobisisobutyronite (AIBN), and peroxides such as benzoyl peroxide.

At block 102, a pigment and a solvent are mixed with the mixture to form a colored material. The mixture has a mass percentage of about 40% to about 75% of the total mass of the colored material. The pigment has a mass percentage of about 10% to about 55% of the total mass of the colored material. The solvent has a mass percentage of about 1% to about 20% of the total mass of the colored material.

The pigment comprises at least one active functional group. The pigment may be selected from a group consisting of C.I. Reactive Blue 19, C.I. Reactive Red 11, C.I. Reactive Yellow 15, and C.I. Reactive Black 5.

The solvent may be water or an organic solvent. The organic solvent may be selected from a group consisting of methyl alcohol, tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-i sopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-l-cyclopentanol, 2-phenyl-2-propanol, 2-methoxy-2-methyl-2-propanol 2,3 ,4-trimethyl-3-pentanol, 3, 7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dim ethylpropionamide, dimethyl formamide, dimethyl acetamide, dimethyl propionamide, and N-methyl pyrrolidinone.

At block 103, the colored material is placed into a mold and is exposed to ultraviolet radiation or is heated, to cause the hydrophilic monomer, the functionalized vinylic monomer, the cross-linking agent, and the initiator in the colored material to undergo a polymerization reaction to form a cross-linking network. The clay in the mixture is dispersed in the cross-linking network, thereby forming the colored film. In at least one exemplary embodiment, the colored film has a thickness of about 1 μm to about 100 μm. A time period for the ultraviolet irradiation or the heating is from about 10 sec to about 5 min, thereby forming the colored film which is partially cured.

EXAMPLE 1

A mixture was formed by mixing 2-hydroxyethylmethacrylate, a functionalized vinylic monomer has a chemical structural formula of laponite, ethylene glycol dimethacrylate, and ethyl 2-dimethylaminobenzoate. The 2-hydroxyethylmethacrylate had a mass percentage of 30.24% of a total mass of the mixture. The functionalized vinylic monomer had a mass percentage of 40.58% of a total mass of the mixture. The laponite had a mass percentage of 10.05% of a total mass of the mixture. The ethylene glycol dimethacrylate had a mass percentage of 10.06% of a total mass of the mixture. The ethyl 2-dimethylaminobenzoate had a mass percentage of 8.62% of a total mass of the mixture. A colored material was formed by mixing the mixture, C.I. Reactive Black 5, and methyl alcohol. The mixture had a mass percentage of 61.07% of a total mass of the colored material. C.I. Reactive Black 5 had a mass percentage of 29.82% of a total mass of the colored material. The methyl alcohol had a mass percentage of 9.11% of a total mass of the colored material. The colored material was fed into a mold and was exposed to ultraviolet radiation for 10 sec, thereby forming a partially cured colored film.

EXAMPLE 2

A mixture was formed by mixing 2-hydroxyethylmethacrylate, a functionalized vinylic monomer has a chemical structural formula of laponite, ethylene glycol dimethacrylate, and 2-isopropylthioxanthone. The 2-hydroxyethylmethacrylate had a mass percentage of 30.08% of a total mass of the mixture. The functionalized vinylic monomer had a mass percentage of 41.15% of a total mass of the mixture. The laponite had a mass percentage of 12.45% of a total mass of the mixture. The ethylene glycol dimethacrylate had a mass percentage of 5.78% of a total mass of the mixture. The 2-isopropylthioxanthone had a mass percentage of 10.54% of a total mass of the mixture. A colored material was formed by mixing the mixture, C.I. Reactive Black 5, and methyl alcohol. The mixture had a mass percentage of 70.05% of a total mass of the colored material. C.I. Reactive Black 5 had a mass percentage of 20.34% of a total mass of the colored material. The methyl alcohol had a mass percentage of 9.61% of a total mass of the colored material. The colored material was fed into a mold and was exposed to ultraviolet radiation for 30 sec, thereby forming a partially cured colored film.

EXAMPLE 3

A mixture was formed by mixing 2-hydroxyethylmethacrylate, a functionalized vinylic monomer has a chemical structural formula of laponite, ethylene glycol dimethacrylate, and ethyl 2-dimethylaminobenzoate. The 2-hydroxyethylmethacrylate had a mass percentage of 30.24% of a total mass of the mixture. The functionalized vinylic monomer had a mass percentage of 40.58% of a total mass of the mixture. The laponite had a mass percentage of 10.05% of a total mass of the mixture. The ethylene glycol dimethacrylate had a mass percentage of 10.06% of a total mass of the mixture. The ethyl 2-dimethylaminobenzoate had a mass percentage of 8.62% of a total mass of the mixture. A colored material was formed by mixing the mixture, methyl alcohol, and a mixed pigment comprising C.I. Reactive Red 11 and C.I. Reactive Blue 19. The mixture had a mass percentage of 62.03% of a total mass of the colored material. The mixed pigment had a mass percentage of 32.54% of a total mass of the colored material. The methyl alcohol had a mass percentage of 5.43% of a total mass of the colored material. C.I. Reactive Red 11 had a mass percentage of 20% of a total mass of the mixed pigment. C.I. Reactive Blue 19 had a mass percentage of 80% of a total mass of the mixed pigment. The colored material was fed into a mold and was exposed to ultraviolet radiation for 15 sec, thereby forming a partially cured colored film.

EXAMPLE 4

A mixture was formed by mixing 2-hydroxyethylmethacrylate, a functionalized vinylic monomer has a chemical structural formula of laponite, ethylene glycol dimethacrylate, and ethyl 2-dimethylaminobenzoate. The 2-hydroxyethylmethacrylate had a mass percentage of 35.06% of a total mass of the mixture. The functionalized vinylic monomer had a mass percentage of 38.74% of a total mass of the mixture. The laponite had a mass percentage of 12.06% of a total mass of the mixture. The ethylene glycol dimethacrylate had a mass percentage of 5.78% of a total mass of the mixture. The ethyl 2-dimethylaminobenzoate had a mass percentage of 8.36% of a total mass of the mixture. A colored material was formed by mixing the mixture, methyl alcohol, and a mixed pigment comprising C.I. Reactive Red 11, C.I. Reactive Yellow 15, and C.I. Reactive Blue 19. The mixture had a mass percentage of 58.65% of a total mass of the colored material. The mixed pigment had a mass percentage of 33.15% of a total mass of the colored material. The methyl alcohol had a mass percentage of 8.2% of a total mass of the colored material. C.I. Reactive Red 11 had a mass percentage of 77% of a total mass of the mixed pigment. C.I. Reactive Yellow 15 had a mass percentage of 22.5% of a total mass of the mixed pigment. C.I. Reactive Blue 19 had a mass percentage of 0.5% of a total mass of the mixed pigment. The colored material was fed into a mold and was exposed to ultraviolet radiation for 15 sec, thereby forming a partially cured colored film.

EXAMPLE 5

A mixture was formed by mixing 2-hydroxyethylmethacrylate, a functionalized vinylic monomer has a chemical structural formula of montmorillonite, ethylene glycol dimethacrylate, and ethyl 2-dimethylaminobenzoate. The 2-hydroxyethylmethacrylate had a mass percentage of 38.06% of a total mass of the mixture. The functionalized vinylic monomer had a mass percentage of 35.62% of a total mass of the mixture. The montmorillonite had a mass percentage of 9.78% of a total mass of the mixture. The ethylene glycol dimethacrylate had a mass percentage of 5.64% of a total mass of the mixture. The ethyl 2-dimethylaminobenzoate had a mass percentage of 10.9% of a total mass of the mixture. A colored material was formed by mixing the mixture, methyl alcohol, and a mixed pigment comprising C.I. Reactive Red 11, C.I. Reactive Yellow 15, and C.I. Reactive Blue 19. The mixture had a mass percentage of 50.34% of a total mass of the colored material. The mixed pigment had a mass percentage of 40.26% of a total mass of the colored material. The methyl alcohol had a mass percentage of 9.4% of a total mass of the colored material. C.I. Reactive Red 11 had a mass percentage of 77% of a total mass of the mixed pigment. C.I. Reactive Yellow 15 had a mass percentage of 22.5% of a total mass of the mixed pigment. C.I. Reactive Blue 19 had a mass percentage of 0.5% of a total mass of the mixed pigment. The colored material was fed into a mold and was exposed to ultraviolet radiation for 15 sec, thereby forming a partially cured colored film.

A colored material used in the above method comprises a pigment, a solvent, and a mixture comprising a hydrophilic monomer, a functionalized vinylic monomer, a clay, a cross-linking agent, and an initiator. The hydrophilic monomer has a mass percentage of about 20% to about 50% of a total mass of the mixture. The functionalized vinylic monomer has a mass percentage of about 25% to about 60% of the total mass of the mixture. The clay has a mass percentage of about 0.5% to about 42% of the total mass of the mixture. The cross-linking agent has a mass percentage of about 1% to about 25% of the total mass of the mixture. The initiator has a mass percentage of about 0.5% to about 20% of the total mass of the mixture. The mixture has a mass percentage of about 40% to about 75% of the total mass of the colored material. The pigment has a mass percentage of about 10% to about 55% of the total mass of the colored material. The solvent has a mass percentage of about 1% to about 20% of the total mass of the colored material. When the colored material is exposed to ultraviolet radiation or is heated, the hydrophilic monomer, the functionalized vinylic monomer, the cross-linking agent, and the initiator undergo a polymerization reaction to form a cross-linking network. The clay in the mixture is dispersed in the cross-linking network, thereby forming the colored film.

A colored film made by the method is formed by exposing a mixture of the hydrophilic monomer, the functionalized vinylic monomer, the clay, the cross-linking agent, and the initiator to ultraviolet radiation or heating the mixture. The hydrophilic monomer, the functionalized vinylic monomer, the cross-linking agent, and the initiator undergo a polymerization reaction to form a cross-linking network, and the clay in the mixture is dispersed in the cross-linking network. In at least one exemplary embodiment, the colored film has a thickness of about 1μm to about 100 μm.

Figure 2:
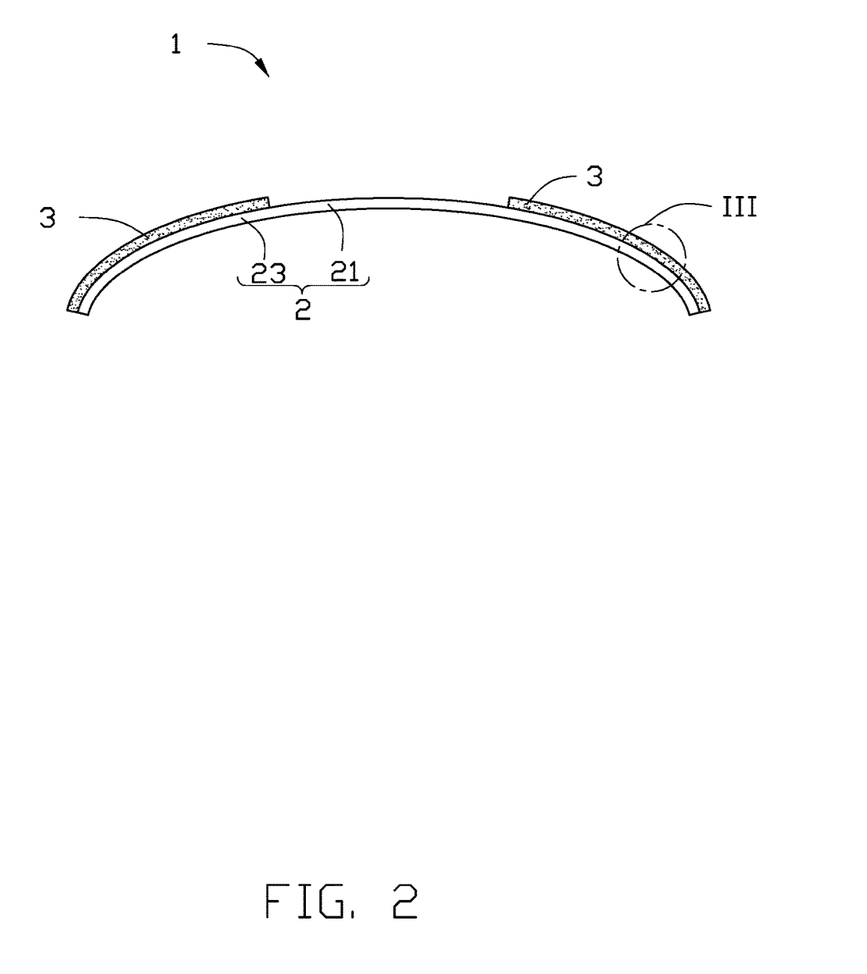
FIG. 2 is a cross-sectional view of an exemplary embodiment of an ophthalmic lens.
Figure 3:
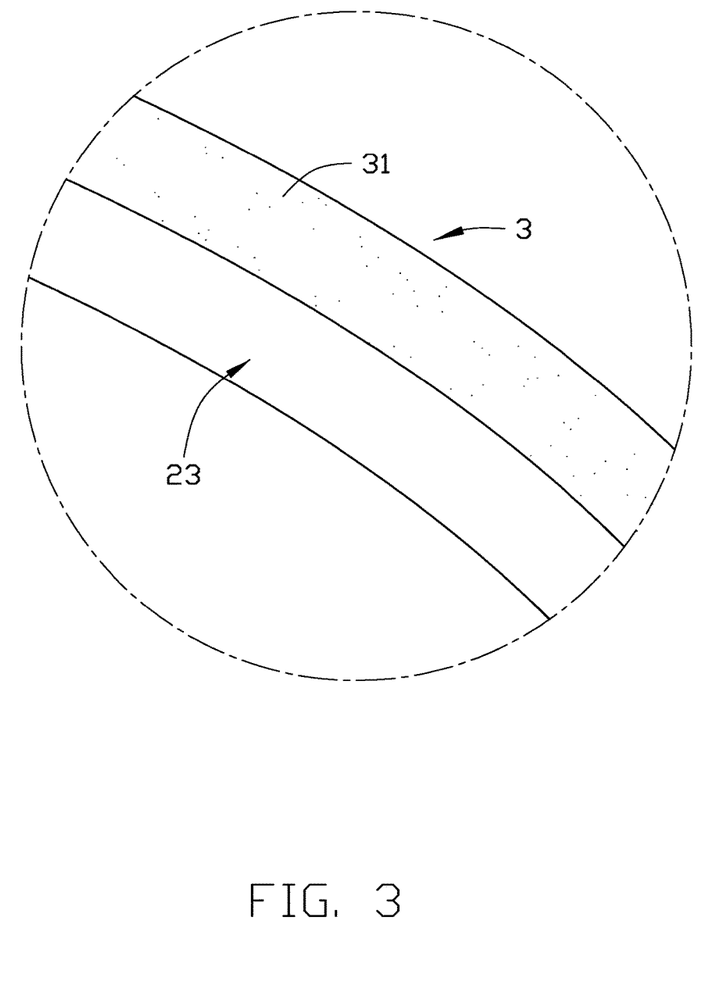
FIG. 3 is an enlarged cross section of circled portion III of FIG. 2.

FIGS. 2 and 3 illustrate an exemplary embodiment of an ophthalmic lens 1. The ophthalmic lens 1 comprises a lens substrate 2 and a colored film 3 formed on a surface of the lens substrate 2. The lens substrate 2 may be made of hydrogel or silicone hydrogel. The lens substrate 2 comprises a transparent pupil region 21 and an annular iris region 23 surrounding the pupil region 21. The colored film 3 is formed on a surface of the iris region 23.

In at least one exemplary embodiment, the colored film 3 can be made by the above method. A lens substrate material is placed into the mold, and is heated or exposed to ultraviolet radiation to form the lens substrate 2. This causes the colored film 3 to be fully cured and bonded to the surface of the lens substrate 2. A time period for the ultraviolet irradiation or heating is from about 5 min to about 120 min. The functional group in the functionalized vinylic monomer is bonded to the surface of the lens substrate 2. The clay 31 in the colored film 3 is bonded to the surface of the lens substrate 2 by at least one of hydrogen bonding and siloxane bonding. A bonding between the colored film 3 and the lens substrate 2 can be improved. In another exemplary embodiment, the colored material is coated on the surface of the lens substrate 2, and is then heated or exposed to ultraviolet radiation to form the colored film 3.

Figure 4:
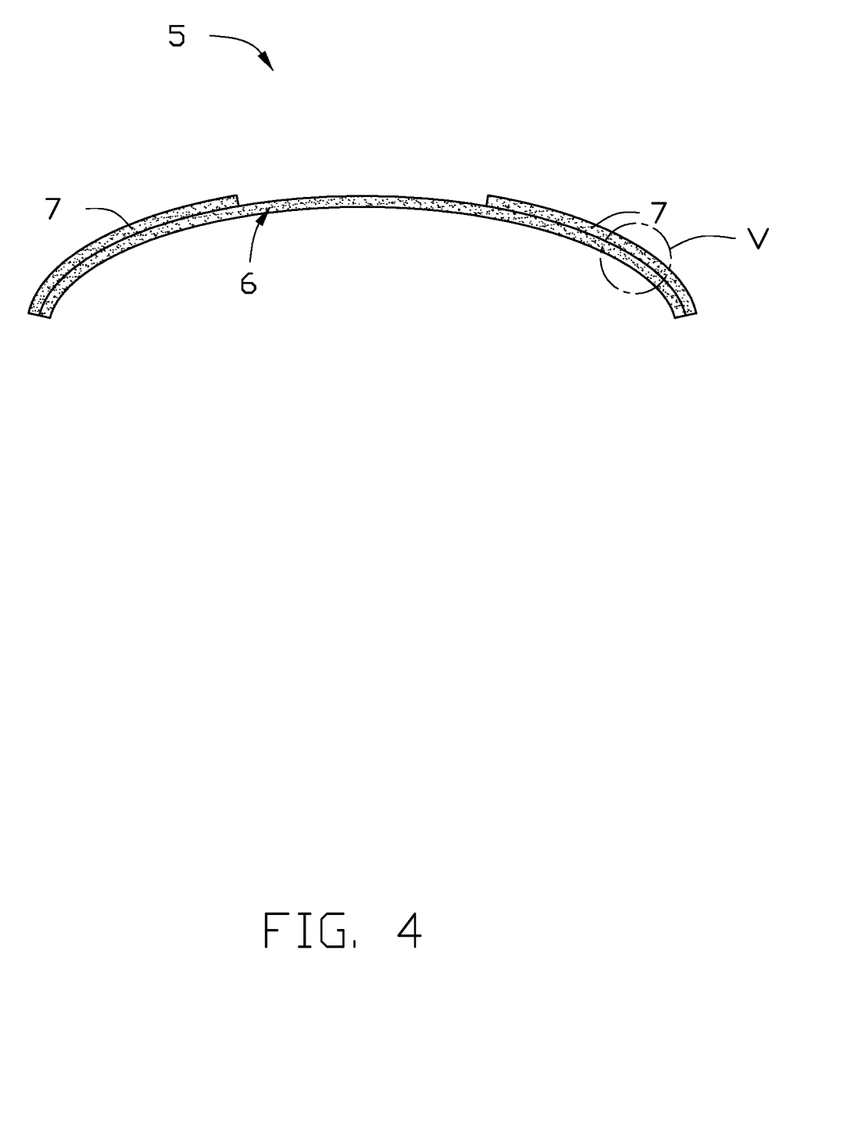
FIG. 4 is a cross-sectional view of another exemplary embodiment of an ophthalmic lens.
Figure 5:
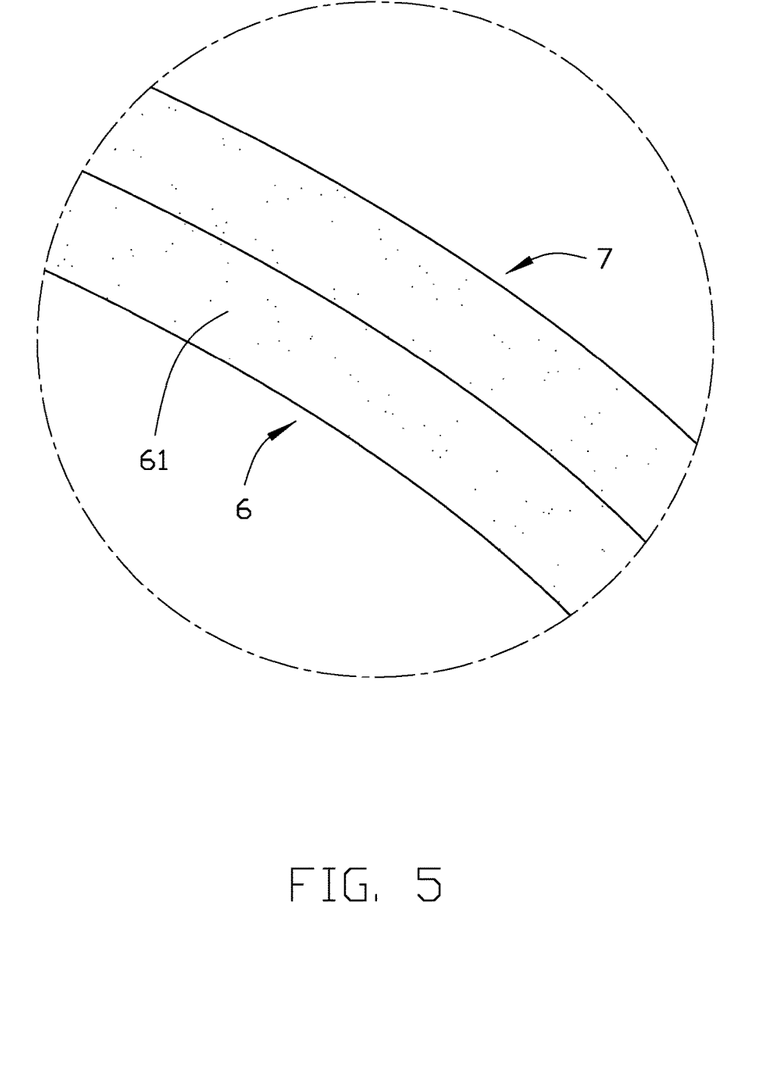
FIG. 5 is an enlarged cross section of circled portion V of FIG. 4.

FIGS. 4 and 5 illustrate another exemplary embodiment, namely ophthalmic lens 5. Ophthalmic lens 5 comprises a lens substrate 6 and a colored film 7 formed on a surface of the lens substrate 6. A clay 61 is dispersed in the lens substrate 6. The clay 61 in the lens substrate 6 is bonded to the surface of the colored film 7 by at least one of hydrogen bonding and siloxane bonding, so that a bonding between the colored film 7 and the lens substrate 2 can be improved, to prevent the colored film 7 from peeling from the lens substrate 6.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for making a colored film, comprising:
   providing a mixture comprising a hydrophilic monomer, a functionalized vinylic monomer, a clay, a cross-linking agent, and an initiator;
   mixing a pigment and a solvent with the mixture to form a colored material; and
   placing the colored material into a mold, and exposing the colored material to ultraviolet radiation or heating the colored material, to cause the hydrophilic monomer, the functionalized vinylic monomer, the cross-linking agent, and the initiator in the colored material to undergo a polymerization reaction to form a cross-linking network, and the clay in the colored material to be dispersed in the cross-linking network, thereby forming the colored film;
   wherein the hydrophilic monomer has a mass percentage of about 20% to about 50% of a total mass of the mixture, the functionalized vinylic monomer has a mass percentage of about 25% to about 60% of the total mass of the mixture, the clay has a mass percentage of about 0.5% to about 42% of the total mass of the mixture, the cross-linking agent has a mass percentage of about 1% to about 25% of the total mass of the mixture, the initiator has a mass percentage of about 0.5% to about 20% of the total mass of the mixture, the mixture has a mass percentage of about 40% to about 75% of the total mass of the colored material, the pigment has a mass percentage of about 10% to about 55% of the total mass of the colored material, the solvent has a mass percentage of about 1% to about 20% of the total mass of the colored material.

2. The method of claim 1, wherein the clay comprises aluminium silicate.

3. The method of claim 1, wherein the functionalized vinylic monomer comprises at least one functional group selected from a group consisting of hydroxyl group, amino group, imino group, carboxyl group, epoxy group, amide group, acyl halogeno group, isothiocyanate group, isocyanate group, halogeno group, and acid anhydride.

4. The method of claim 1, wherein the solvent is water or an organic solvent.

5. A colored material comprising:
   a pigment;
   a solvent; and
   a mixture comprising a hydrophilic monomer, a functionalized vinylic monomer, a clay, a cross-linking agent, and an initiator;
   wherein the hydrophilic monomer has a mass percentage of about 20% to about 50% of a total mass of the mixture, the functionalized vinylic monomer has a mass percentage of about 25% to about 60% of the total mass of the mixture, the clay has a mass percentage of about 0.5% to about 42% of the total mass of the mixture, the cross-linking agent has a mass percentage of about 1% to about 25% of the total mass of the mixture, the initiator has a mass percentage of about 0.5% to about 20% of the total mass of the mixture, the mixture has a mass percentage of about 40% to about 75% of the total mass of the colored material, the pigment has a mass percentage of about 10% to about 55% of the total mass of the colored material, the solvent has a mass percentage of about 1% to about 20% of the total mass of the colored material.

6. The colored material of claim 5, wherein the clay comprises aluminium silicate.

7. The colored material of claim 5, wherein the functionalized vinylic monomer comprises at least one functional group selected from a group consisting of hydroxyl group, amino group, imino group, carboxyl group, epoxy group, amide group, acyl halogeno group, isothiocyanate group, isocyanate group, halogeno group, and acid anhydride.

8. The colored material of claim 5, wherein the solvent is water or an organic solvent.

9. A colored film comprising:
   a cross-linking network; and
   a clay dispersed in the cross-linking network;
   wherein the cross-linking network is formed by providing a colored material comprising a pigment, a solvent, and a mixture of a hydrophilic monomer, a functionalized vinylic monomer, a clay, a cross-linking agent, and an initiator, and exposing the colored material to ultraviolet radiation or heating the colored material, to cause the hydrophilic monomer, the functionalized vinylic monomer, the cross-linking agent, and the initiator to undergo a polymerization reaction; the hydrophilic monomer has a mass percentage of about 20% to about 50% of a total mass of the mixture, the functionalized vinylic monomer has a mass percentage of about 25% to about 60% of the total mass of the mixture, the clay has a mass percentage of about 0.5% to about 42% of the total mass of the mixture, the cross-linking agent has a mass percentage of about 1% to about 25% of the total mass of the mixture, the initiator has a mass percentage of about 0.5% to about 20% of the total mass of the mixture, the mixture has a mass percentage of about 40% to about 75% of the total mass of the colored material, the pigment has a mass percentage of about 10% to about 55% of the total mass of the colored material, the solvent has a mass percentage of about 1% to about 20% of the total mass of the colored material.

10. The colored film of claim 9, wherein the clay comprises aluminium silicate.

11. The colored film of claim 9, wherein the functionalized vinylic monomer comprises at least one functional group selected from a group consisting of hydroxyl group, amino group, imino group, carboxyl group, epoxy group, amide group, acyl halogeno group, isothiocyanate group, isocyanate group, halogeno group, and acid anhydride.

12. An ophthalmic lens comprising:
    a lens substrate comprising a transparent pupil region and a substantially annular iris region surrounding the pupil region; and
    a colored film attached to a surface of the iris region;
    wherein the colored film comprises a cross-linking network, and a clay is dispersed in the cross-linking network, the cross-linking network is formed by providing a colored material comprising a pigment, a solvent, and a mixture of a hydrophilic monomer, a functionalized vinylic monomer, a clay, a cross-linking agent, and an initiator, and exposing the colored material to ultraviolet radiation or heating the colored material, to cause the hydrophilic monomer, the functionalized vinylic monomer, the cross-linking agent, and the initiator to undergo a polymerization reaction.

13. The ophthalmic lens of claim 12, wherein the clay comprises aluminium silicate.

14. The ophthalmic lens of claim 13, wherein the hydrophilic monomer has a mass percentage of about 20% to about 50% of a total mass of the mixture, the functionalized vinylic monomer has a mass percentage of about 25% to about 60% of the total mass of the mixture, the clay has a mass percentage of about 0.5% to about 42% of the total mass of the mixture, the cross-linking agent has a mass percentage of about 1% to about 25% of the total mass of the mixture, the initiator has a mass percentage of about 0.5% to about 20% of the total mass of the mixture, the mixture has a mass percentage of about 40% to about 75% of the total mass of the colored material, the pigment has a mass percentage of about 10% to about 55% of the total mass of the colored material, the solvent has a mass percentage of about 1% to about 20% of the total mass of the colored material.

15. The ophthalmic lens of claim 13, wherein the functionalized vinylic monomer comprises at least one functional group selected from a group consisting of hydroxyl group, amino group, imino group, carboxyl group, epoxy group, amide group, acyl halogeno group, isothiocyanate group, isocyanate group, halogeno group, and acid anhydride.

16. The ophthalmic lens of claim 13, wherein the lens substrate further comprises the clay.

* * * * *